United States Patent [19]
Kron

[11] Patent Number: 4,698,722
[45] Date of Patent: Oct. 6, 1987

[54] TRANSIENT PROTECTION UNIT

[75] Inventor: Karl L. E. Kron, Järfälla, Sweden

[73] Assignee: Telefonaktiebolaget L M Ericsson, Stockholm, Sweden

[21] Appl. No.: 786,953

[22] PCT Filed: Jan. 29, 1985

[86] PCT No.: PCT/SE85/00040
§ 371 Date: Oct. 3, 1985
§ 102(e) Date: Oct. 3, 1985

[87] PCT Pub. No.: WO85/03602
PCT Pub. Date: Aug. 15, 1985

[30] Foreign Application Priority Data
Feb. 3, 1984 [SE] Sweden ................................. 8400555

[51] Int. Cl.$^4$ ............................................. H02H 3/22
[52] U.S. Cl. ................................. 361/111; 361/119; 361/399; 455/301
[58] Field of Search ............... 361/111, 118, 117, 119, 361/400, 398, 399, 403, 423, 424; 455/26, 300, 301; 376/254, 255; 357/79

[56] References Cited
U.S. PATENT DOCUMENTS 3,917,981 11/1975 Kern ................................... 361/118
3,992,652 11/1976 Blaisdell et al. ..................... 361/118
4,138,711 2/1979 Bremenour et al. ................ 361/424
4,481,559 11/1984 Buck et al. ........................... 361/398
4,525,770 6/1985 Peretta ................................. 361/427
4,567,543 1/1986 Miniet ................................. 361/398

FOREIGN PATENT DOCUMENTS
0092052 4/1982 European Pat. Off. .
2428266 5/1978 Fed. Rep. of Germany .

Primary Examiner—A. D. Pellinen
Assistant Examiner—Jeffrey A. Gaffin
Attorney, Agent, or Firm—Roberts, Spiecens & Cohen

[57] ABSTRACT

Transient protection unit intended for connection to signal conductors for protecting equipment connected to the conductors against EMP and EMI. The unit includes primary protection components in the form of gas discharge tubes between the conductors and earth, and secondary protection components connected after the primary protection, in the form of filter components (L,C) or the like. All the components are mounted on a circuit board (6), the printed circuit pattern of which includes contact surfaces (10) for the unearthed electrodes of the tubes (X3-X5), against which contact surfaces the tubes are mounted by clamping with the aid of a metal member (18) serving as earth conductor.

2 Claims, 3 Drawing Figures

TRANSIENT PROTECTION UNIT

FIELD OF INVENTION

The present invention relates to a transient protection unit of the type intended for connection to signal conductors for protecting equipment connected to the conductors, and more particularly to a unit of the type including primary protection components in the form of gas discharge tubes connected between the conductors and ground, and secondary protection components in the form of filter components and the like connected to the conductors. By "signal conductors" is generally meant telephone and signal lines for different types of information transfer, as well as conductors for operation, alarm and indication functions involving small operational currents and voltages.

BACKGROUND

Transient protection units of the above-indicated kind are intended to suppress dynamic variations in conductors generated by NEMP and LEMP (i.e., electromagnetic pulses arising from nuclear missile explosions or lightening and) also electromagnetic interference (EMI). In the case of pulses arising from nuclear missile explosions, there may be maximum values in the order of magnitude of 50 kilovolts with rise times in the order of magnitude of 5 ns. For effectively leading away as large a part as possible of such a pulse, associated gas discharge tubes should have a very low inductance to ground.

The secondary protection part is intended and dimensioned for catering to the remainder of the original pulse, which does not manage to be led to ground, and which may have an amplitude in the maximum order of magnitude of 1200 volts. It is important for the secondary protection part that there is as good screening outwardly as possible. In some cases, this requirement has been found inconsistent with the requirement for low inductance to ground of the gas discharge tubes.

SUMMARY OF INVENTION

An object of the present invention is to provide a transient protection unit which ensures a very low inductance to ground of gas discharge tubes and a very effective screening of the secondary protection part.

To achieve the above and other objects of the invention there is provided a transient protection apparatus adapted for connection to signal conductors for protecting equipment connected thereto. The apparatus provided in accordance with the invention comprises primary protection components in the form of gas discharge tubes which extend between the conductors and ground. The apparatus furthermore comprises secondary protection components connected to the primary protection components and being in the form of filter components including notably capacitors and inductors. The protection components are mounted on a circuit board which extends through the wall of a cabinet included in the apparatus. The circuit board has a contact surface. The apparatus furthermore includes a conducting bar connected with the aforesaid wall.

According to a further aspect of the invention the circuit board extends through the wall of the cabinet in such a manner that the primary protection components are located outside of the cabinet with the secondary protection components being located inside of the cabinet. The gas discharge tubes which constitute the primary protection components are clamped with the electrodes thereof in such a manner as to be located between the contact surface of the board and the aforementioned conducting bar. The conducting bar is connected with the above-mentioned wall. Also included in the apparatus of the invention are further conductors arranged between the primary and secondary protection components. These further conductors extend in screened relationship inside of the circuit board and through the wall thereby to connect the primary and secondary protection components.

According to yet another aspect of the invention, the secondary components are encapsulated by a middle case. It will be noted in the description which follows hereinbelow that the conducting bars form a portion of the metal case.

The invention and its advantages will next be described in detail with reference to an embodiment illustrated in the appended drawings.

DETAILED DESCRIPTION

Figure 1:
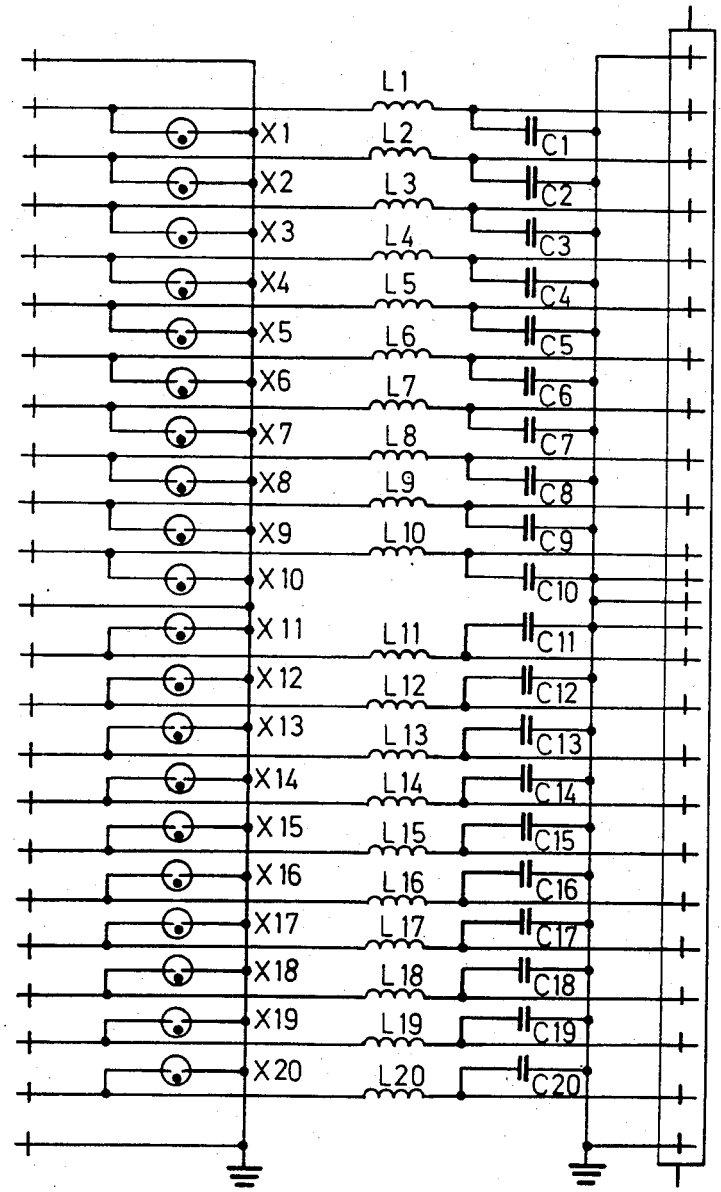
FIG. 1 illustrates a typical electrical wiring diagram for a transient protection unit in accordance with the invention.

The exemplifying wiring diagram in FIG. 1 of a transient protection unit, which is intended for 20 conductors, is entirely conventional. Included therein is a spark gap tube X1–20 filled with noble gas for each conductor, the tube being connected between the conductor and ground. In the present embodiment, the tubes can be assumed to be, for example, of the Ericsson NGC 40201 type. These tubes are button-shaped, with a diameter of about 8 mms and a thickness of about 6 mms. However, it will of course be understood that the invention can also be applied to tubes having other dimensions. The dimensions of the fitting devices described below for the tubes are adapted to suit the tubes. The gas discharge tubes form primary protection in the transient protection unit, and cater to the primary transient, which in certain cases can have an amplitude of 50 kilovolts and a rising time of 5 ns, as mentioned above. Following the gas discharge tubes, there are lowpass filters including inductors L1–20 and capacitors C1–20. These filters are intended and dimensioned for further suppressing residual parts of the transient.

Figure 2:
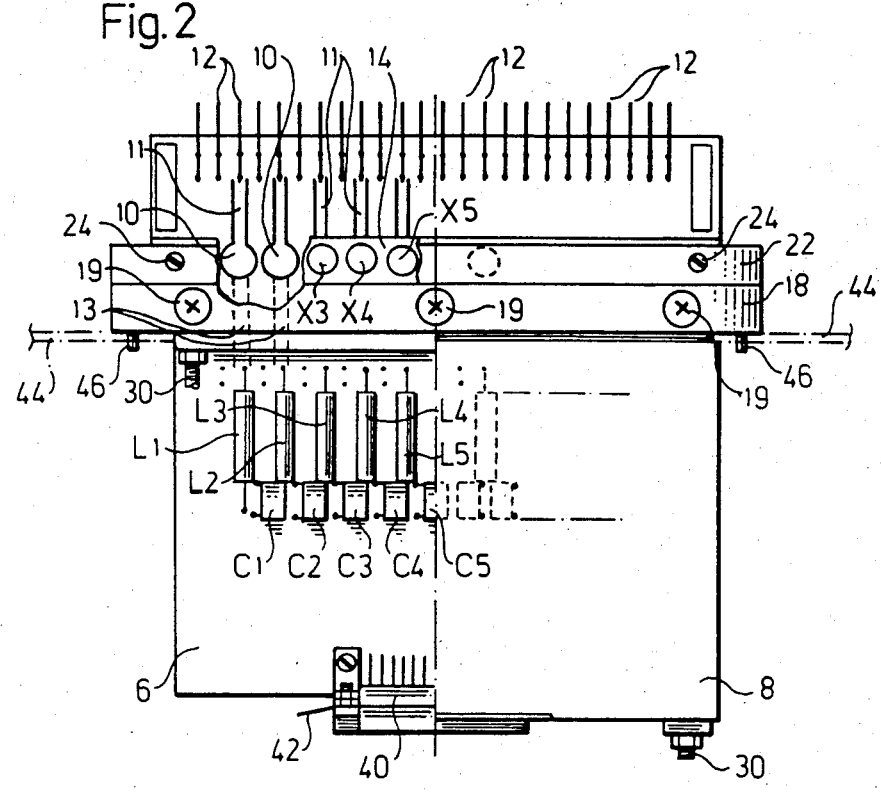
FIG. 2 is a side view of a transient protection unit provided in accordance with the invention.

The transient protection unit in accordance with the invention is built on a circuit board 2, which consists of two combined boards 4 and 6 in the illustrated embodiment. Half of the above-mentioned components are mounted on the outside of each of the boards 4 and 6. The righthand portion of FIG. 2 illustrates the transient protection unit with a screening case 8 for the secondary protection part, this case 8 being more fully described below. The lefthand portion of FIG. 2 illustrates the unit with the case 8 cut away. Half of the secondary protection components of the board 6, mounted on the outside of the board, will be seen in the Figure. On the outside, the circuit patterns of the boards 4 and 6 each include ten contact surfaces in a row for direct contact with the ungrounded electrode of the corresponding one of the gas discharge tubes X1–20. In the lefthand half of FIG. 2, further parts have been cut away to show two of these contact surfaces, which are indicated at 10. These contact surfaces 10 are connected via conductors 11 to input pins 12 of the unit.

On both sides of each board 4 and 6, the printed circuit is tightly surrounded by a residual metallic surface (not shown) which serves as a screen and grounding electrode. On the sides of the boards 4 and 6 facing each other, the printed circuit includes opposingly arranged conductors, indicated by dashed lines 13, which unite each of the contact surfaces 10 with a connection on a corresponding one of the inductors L1–20. These communication conductors 13, extending between the primary and secondary parts of the transient protection unit, are thus as least partially screened by being positioned inside the divided circuit board 2.

On either side of the board 2, the ten gas discharge tubes are situated in corresponding bores in a plastic, bar-like holder 14, which is fitted for easy removal in a manner described in detail below. Extending over the entire width of either side of the board 2, and in intimate contact with the above-mentioned metallic surface, serving as screen and grounding electrode on the sides of the board, there are two metallic mounting bars 16 and 18 which are retained by three screws 19 passing therethrough. The bars 16, 18 have strip-like projections 20, 22 extending parallel to the surfaces of the boards 4, 6. Screws 24, threaded into the projections 20 and 22, continue down into holes in the ends of the holders 14 and make the latter easily removable. The projections 20, 22 also serve as stops for elongate contact springs 26, 28, which are bent into a U-shaped cross section. The legs of the springs 26, 28 facing towards the discharge tubes are divided into ten contact spring tongues adapted for contact with the respective of the grounding electrodes of the tubes. In the lefthand half of FIG. 2, a portion of the projection 22 and spring 28 have been cut away to show a part of the holder 14 in plan with gas discharge tubes X3–5 inserted therein. Grounding of the tubes thus takes place via the metal bars 16, 18, and as described below they are directly connected to a grounded protective case in an apparatus cabinet, in which the transient protection unit of the invention is intended to be used.

Figure 3:
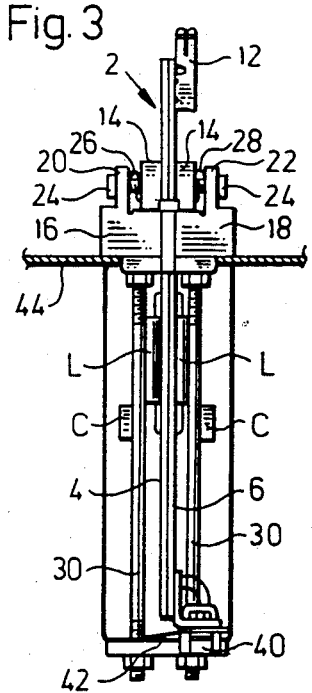
FIG. 3 is an end view of the unit of FIG. 2 partially in section.

The case 8, taken over the secondary protection part of the protection unit, and shown in FIG. 3 with a cut-away end wall, is kept in place, with its open end edge closeley engaging against the underside of the metal bars 16, 18, with the aid of four threaded rods 30, which are screwed into the bars 16, 18 and extend down through the bottom of the casing 8, where they are provided with nuts 32. It is manifest that the casing 8 and bars 20, 22 together form an effective and tight encapsulation around the secondary protective part.

It is indicated at 40 how the outgoing conductors of the transient protection unit are collected together in a multipin contact means passing through the bottom of the casing 8. This contact means is effectively grounded to the casing 8 with the aid of an grounding tab indicated at 42.

In the transient protection unit described above, the mounting bars 16 and 18 can be used for attaching the unit to the edges of an opening in a grounded metal wall of a cabinet, the secondary protection part being situated inside the cabinet. Such a wall is indicated at 44, with screws 46 for mounting the unit. The inputs to the transient protection unit are then connected to contact means which are accessible from the outside of the cabinet. When it is mounted in the wall of the cabinet, the protective unit can suitably be provided with an extra, protective casing (not shown).

A transient protection unit in accordance with the invention is made up in separated parts, the possibility of which is apparent from the above. It is important for residue transients not to be taken further into the installation which is to be protected. The unit uses the discharge tubes as primary protection and the LC filters as secondary protection. The tubes are placed in the outer "noisy" part and the filter in the inner part. The inner part is encapsulated by a sheet metal case which simultaneously serves as attachment means for the unit. The unit in accordance with the invention can be used where stringent demands are made on avoiding electrical leakage in an installation. Connection providing electrical integrity, for example, for 20 conductors is thus obtained by the described mounting method.

The constructional principle of the invention brings with it several advantages:

It enables modular construction of a connection rack for portable, screened trucks, cabinets, etc.

High packing density.

Easy connection, fitting and dismantling. As will be apparent from the above, this also applies to the gas discharge tubes in relation to the unit itself.

Particularly distinguishing for the unit in accordance with the invention is the mounting of the tubes, as described above, which results in that the tubes have very low inductance to ground, and as mentioned above this is a requirement in connection with EMP. All components are mounted on a circuit board, the metallic surface of which serves as a screen and ground plane. Space can also be made on the board for extra secondary protection of the "transzorber" type, or zener diodes, for the case where extra large demands are made on transient suppression. It will be understood that the invention is, of course, not limited to the above-described arrangement with two separate circuit boards pressed together, but can just as well be applied to a case where all or similary acting printed circuitry is placed in three layers in a single circuit board.

The invention is, of course, not limited to the described and illustrated embodiment, but can be modified within the scope of the following claims.

What is claimed is:

1. Transient protection apparatus connected to signal conductors to protect equipment connected to said conductors, said apparatus comprising primary protection components in the form of gas discharge tubes (X1–20) extending between said conductors and ground and secondary protection components connected to the primary protection components and being in the form of filter components (L1–20, C1–20), the apparatus including a cabinet comprising a wall, a circuit board having a contact surface, a conducting bar connected with said wall, the components being mounted on said circuit board (2,4,6), said circuit board extending through the wall (44) of said cabinet, the primary protection components being located outside of the cabinet, the secondary protection components being located inside of the cabinet, the gas discharge tubes including electrodes and being clamped with said electrodes between said contact surface (10) of the board and said conducting bar (16,18) which is connected with said wall (44), and further conductors (13) between the primary and the secondary protection components, said further conductors extending in screened relationship inside of said circuit board through said wall to connect said primary and secondary protection components.

2. Apparatus as claimed in claim 1, comprising and wherein the secondary components (L1-20, C1-20) are encapsulated by a metal case (8) and said conducting bars (16,18) forming a portion of the metal case.

* * * * *